US012628072B2

(12) United States Patent
Singh et al.

(10) Patent No.: US 12,628,072 B2
(45) Date of Patent: May 12, 2026

(54) BEACONS HAVING SERVICE-SPECIFIC INFORMATION

(71) Applicant: QUALCOMM Incorporated, San Diego, CA (US)

(72) Inventors: Harbeer Singh, Hyderabad (IN); Vamsi Sanka, Hyderabad (IN); Sudhanshu Singh, Hyderabad (IN); Manjoosha Guduri, Secunderabad (IN); Sai Vamshi Ragiphani, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/364,245

(22) Filed: Aug. 2, 2023

(65) Prior Publication Data

US 2025/0048234 A1 Feb. 6, 2025

(51) Int. Cl.
| | |
|---|---|
| *H04W 4/00* | (2018.01) |
| *H04W 48/16* | (2009.01) |
| *H04W 84/12* | (2009.01) |

(52) U.S. Cl.
CPC ............ *H04W 48/16* (2013.01); *H04W 84/12* (2013.01)

(58) Field of Classification Search
CPC ..... H04W 48/16; H04W 48/12; H04W 48/20; H04W 8/005; H04L 67/1051

USPC .......................................................... 370/338
See application file for complete search history.

(56) References Cited

U.S. PATENT DOCUMENTS

| | | | | |
|---|---|---|---|---|
| 2014/0286193 A1* | 9/2014 | Ghaboosi | .............. | H04W 8/186 |
| | | | | 370/254 |
| 2019/0199815 A1* | 6/2019 | Park | ........................ | H04W 8/00 |
| 2019/0320407 A1* | 10/2019 | Goyal | ................. | H04L 41/5058 |
| 2020/0145919 A1* | 5/2020 | Jung | ........................ | H04L 67/51 |
| 2020/0205058 A1* | 6/2020 | Yoshikawa | ........... | H04W 48/08 |
| 2020/0329416 A1* | 10/2020 | Taneja | ................... | H04W 40/02 |
| 2021/0235255 A1* | 7/2021 | Ansari | ................... | H04W 76/14 |
| 2022/0361095 A1* | 11/2022 | Jung | ................... | H04W 56/001 |
| 2023/0189118 A1* | 6/2023 | Jung | ........................ | H04W 8/00 |
| | | | | 455/456.1 |

* cited by examiner

*Primary Examiner* — Temica M Beamer
(74) *Attorney, Agent, or Firm* — Harrity & Harrity, LLP

(57) ABSTRACT

Various aspects of the present disclosure generally relate to wireless communication. In some aspects, a first wireless communication device (WCD) may receive a beacon from a second WCD, the beacon including an indication of service-specific information associated with the second WCD. The WCD may join a cluster associated with the second WCD in association with the service-specific information indicating that a service is available. Numerous other aspects are described.

30 Claims, 7 Drawing Sheets

300

Receive a beacon from a second WCD, the beacon including an indication of service-specific information associated with the second WCD

410

Join a cluster associated with the second WCD in association with the service-specific information indicating that a service is available

420

400

500

510

Transmit a beacon, the beacon including an indication of service-specific information associated with the WCD

520

Transmit a service discovery frame (SDF) within a discovery window, the SDF including an additional indication of additional service-specific information associated with the WCD

BEACONS HAVING SERVICE-SPECIFIC INFORMATION

FIELD OF THE DISCLOSURE

Aspects of the present disclosure generally relate to wireless communication and to techniques and apparatuses for beacons having service-specific information.

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, STAs (also referred to as wireless communication devices (WCDs)) may communicate using direct connections. For example, a first STA may communicate with a second STA via a direct connection. A type of direct connection may include a neighborhood area network (NAN) connection. A STA may use WLAN-based components to communicate via the direct connection in a NAN.

SUMMARY

The systems, methods, and devices of this disclosure each have several innovative aspects, no single one of which is solely responsible for the desirable attributes disclosed herein.

Some aspects described herein relate to a method of wireless communication performed by a first wireless communication device (WCD). The method may include receiving a beacon from a second WCD, the beacon including an indication of service-specific information associated with the second WCD. The method may include joining a cluster associated with the second WCD in association with the service-specific information indicating that a service is available.

Some aspects described herein relate to a method of wireless communication performed by a WCD. The method may include transmitting a beacon, the beacon including an indication of service-specific information associated with the WCD. The method may include transmitting a service discovery frame (SDF) within a discovery window, the SDF including an additional indication of additional service-specific information associated with the WCD.

Some aspects described herein relate to a first WCD for wireless communication. The first WCD may include one or more memories and one or more processors coupled to the one or more memories. The one or more processors individually or collectively may be configured to cause the first WCD to receive a beacon from a second WCD, the beacon including an indication of service-specific information associated with the second WCD. The one or more processors individually or collectively may be configured to cause the first WCD to join a cluster associated with the second WCD in association with the service-specific information indicating that a service is available.

Some aspects described herein relate to a WCD for wireless communication. The WCD may include one or more memories and one or more processors coupled to the one or more memories. The one or more processors individually or collectively may be configured to cause the first WCD to transmit a beacon, the beacon including an indication of service-specific information associated with the WCD. The one or more processors individually or collectively may be configured to cause the first WCD to transmit an SDF within a discovery window, the SDF including an additional indication of additional service-specific information associated with the WCD.

Some aspects described herein relate to a non-transitory computer-readable medium that stores a set of instructions for wireless communication by a first WCD. The set of instructions, when executed by one or more processors of the first WCD, may cause the first WCD to receive a beacon from a second WCD, the beacon including an indication of service-specific information associated with the second WCD. The set of instructions, when executed by one or more processors of the first WCD, may cause the first WCD to join a cluster associated with the second WCD in association with the service-specific information indicating that a service is available.

Some aspects described herein relate to a non-transitory computer-readable medium that stores a set of instructions for wireless communication by a WCD. The set of instructions, when executed by one or more processors of the WCD, may cause the WCD to transmit a beacon, the beacon including an indication of service-specific information associated with the WCD. The set of instructions, when executed by one or more processors of the WCD, may cause the WCD to transmit an SDF within a discovery window, the SDF including an additional indication of additional service-specific information associated with the WCD.

Some aspects described herein relate to a first apparatus for wireless communication. The apparatus may include means for receiving a beacon from a second apparatus, the beacon including an indication of service-specific information associated with the second apparatus. The apparatus may include means for joining a cluster associated with the second apparatus in association with the service-specific information indicating that a service is available.

Some aspects described herein relate to an apparatus for wireless communication. The apparatus may include means for transmitting a beacon, the beacon including an indication of service-specific information associated with the apparatus. The apparatus may include means for transmitting an SDF within a discovery window, the SDF including an additional indication of additional service-specific information associated with the apparatus.

Aspects generally include a method, apparatus, system, computer program product, non-transitory computer-readable medium, user equipment (UE), STA, AP, network node, network entity, wireless communication device, or processing system as substantially described with reference to and as illustrated by the drawings and specification.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
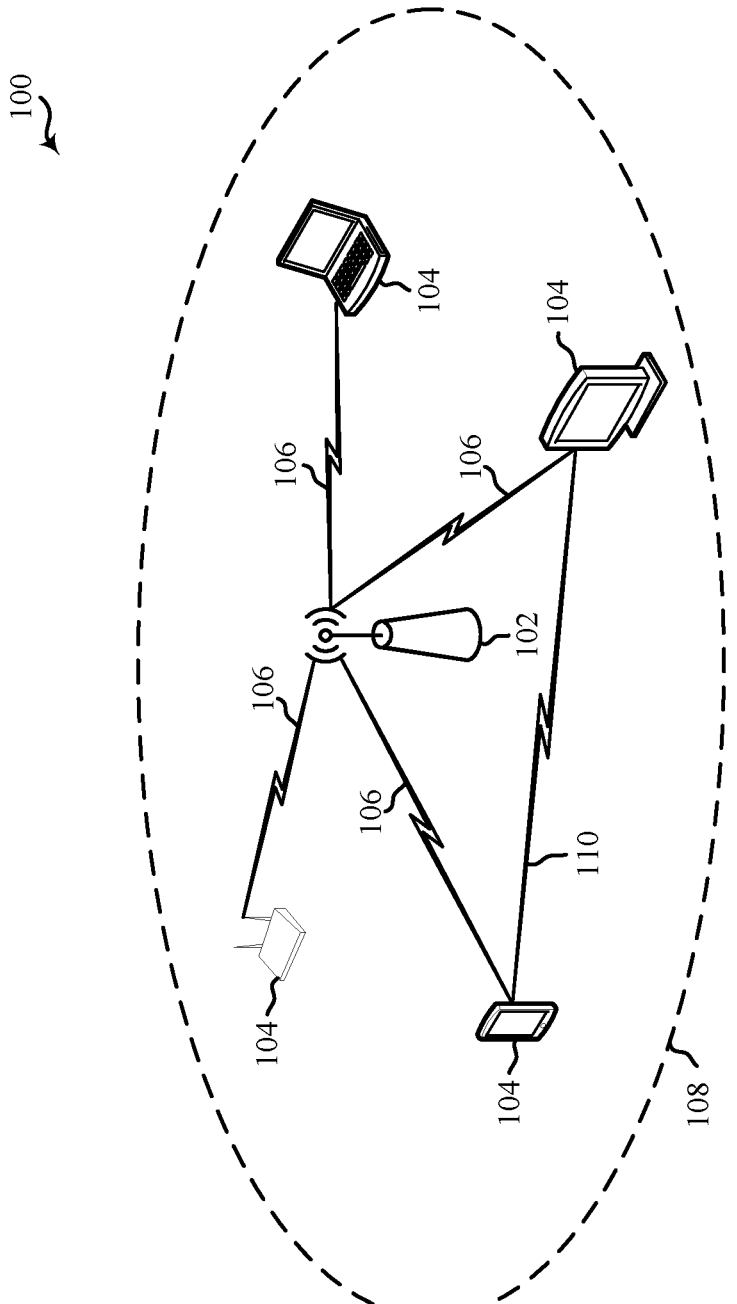
FIG. 1 shows a block diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

In some neighborhood area networks (NANs), a first wireless communication device (WCD) may not be synchronized and may not be aware of services available at a second WCD, and the second WCD may not be synchronized and may not be aware of services available at the first WCD. The first WCD may receive a synchronization beacon to synchronize with the second WCD and join or merge with a cluster of the second WCD. The first WCD may wait for a subsequent discovery window (DW) to receive a service discovery frame (SDF) from the second WCD. Once the first WCD receives the SDF within the subsequent DW, the first WCD may discover services available at the second WCD and may establish further communication using one or more follow up frames and/or proceed to establish a neighbor discovery protocol (NDP) datapath. In the NDP setup, the first WCD and the second WCD may set up a data path and/or perform ranging, among other examples. However, the first WCD may experience unnecessary latency by waiting until receiving a beacon to establish synchronization, then waiting for a synchronized DW to receive the SDF to discover services available at the second WCD, and then sending a follow-up frame to initiate an NDP setup.

Various aspects relate generally to beacons having service-specific information. Some aspects more specifically relate to a synchronization beacon and/or a discovery beacon that includes an indication of service-specific information. In some examples, the service-specific information may include a service descriptor attribute (SDA), one or more information elements of an SDA (e.g., a partial SDA), a service identifier (ID), an instance ID associated with the service that is available at the second WCD, a service control type, a matching filter, a service response filter, service information associated with the service that is available at the second WCD, and/or an attribute ID associated with a service that is available at the second WCD, among other examples of service-specific information that the first WCD may use to identify whether a desired service is available at the second WCD for communication with the first WCD.

Particular aspects of the subject matter described in this disclosure can be implemented to realize one or more of the following potential advantages. By including an indication of service-specific information in a beacon, a discovery process may be expedited and the first WCD may discover an available service at the second WCD with reduced latency. Based at least in part on having reduced latency, the first WCD may improve performance of one or more applications and/or may reduce power consumption associated with communicating with the second WCD multiple times to establish synchronization and to discover services.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a WCD, a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As a result, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics, such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the physical (PHY) and medium access control (MAC) layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As a result, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

As indicated above, FIG. 1 is provided as an example. Other examples may differ from what is described with regard to FIG. 1.

Figure 2:
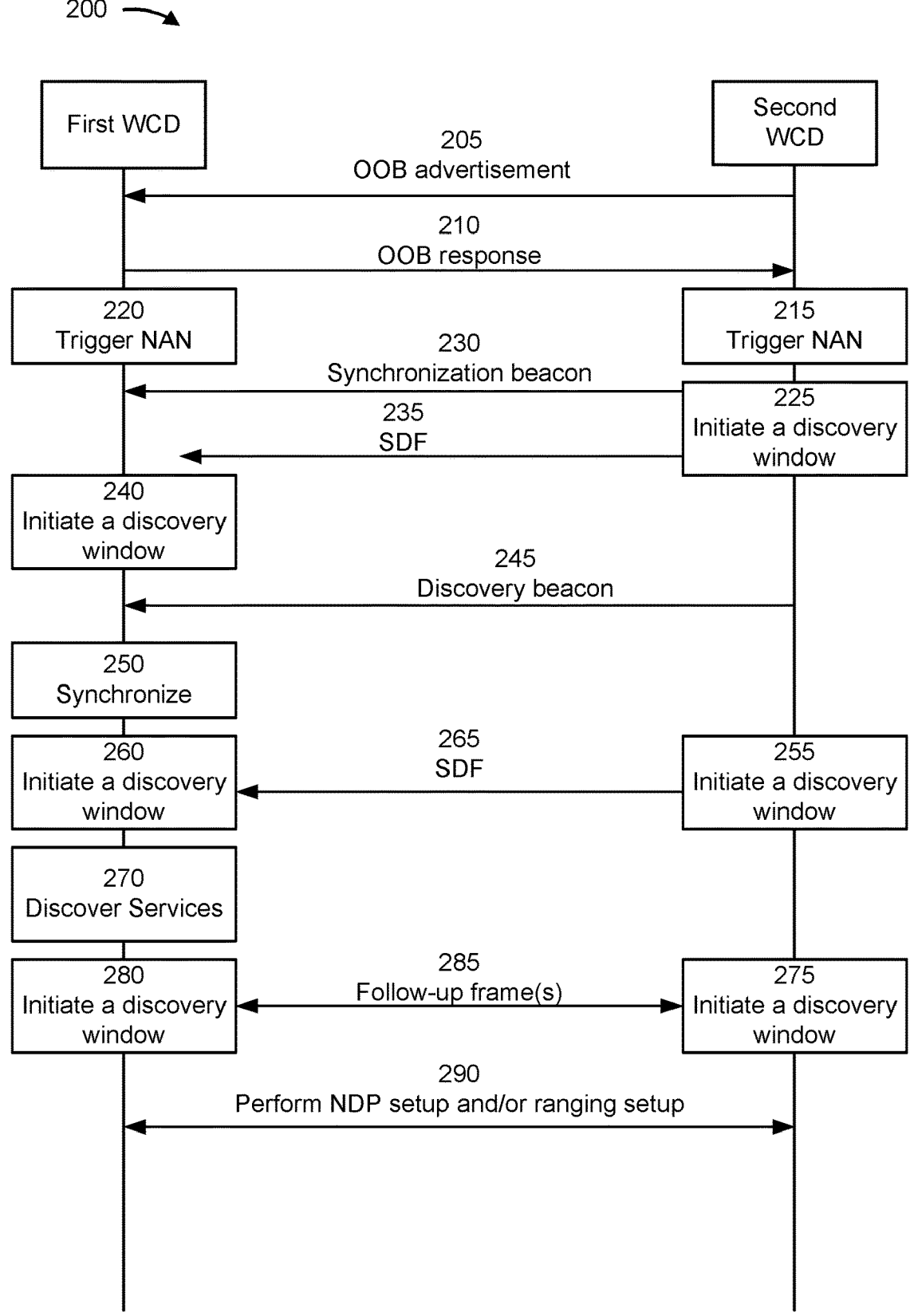
FIG. 2 is a diagram of an example associated with a synchronization and discovery procedure, in accordance with the present disclosure.

FIG. 2 is a diagram of an example 200 associated with a synchronization and discovery procedure, in accordance with the present disclosure. As shown in FIG. 2, a first WCD (for example, an AP) may communicate with a second WCD (for example, a second AP or an STA). The first WCD and the second WCD may be part of a wireless network (for example, WLAN 100), which may include a NAN.

As shown by reference number 205, the first WCD may receive, and the second WCD may transmit, an out-of-band (OOB) advertisement. The OOB advertisement may indicate that the second WCD is available for a NAN connection. The OOB advertisement may include a message in a different protocol than the NAN connection. For example, the second WCD may transmit the message using a WPAN connection.

As shown by reference number 210, the first WCD may transmit, and the second WCD may receive, an OOB response associated with the OOB advertisement. For example, the first WCD may transmit an indication that the first WCD received the OOB advertisement and will attempt to perform a synchronization and discovery procedure.

As shown by reference number 215, the second WCD may trigger NAN operations and, as shown by reference number 220, the first WCD may trigger NAN operations. For example, the first WCD and the second WCD may trigger NAN operations based at least in part on the OOB advertisement and the OOB response indicating that the first WCD and the second WCD support and/or are available for NAN operations.

As shown by reference number 225, the second WCD may initiate a discovery window. A discovery window may be a window of time during which the second WCD may transmit an SDF to indicate one or more services available at the second WCD, to receive an indication of one or more services available at the first WCD, and/or to receive a follow-up frame that indicates a request to perform a neighbor discovery protocol (NDP) data path setup, among other examples.

As shown by reference number 230, the second WCD may transmit, and the first WCD may receive, a synchronization beacon during the discovery window. The synchronization beacon may be associated with a synchronization phase associated with service discovery. In the synchronization phase, WCDs participating in NAN communications achieve synchronization through a synchronization or discovery beacon. When a WCD is started, the WCD may perform an initial scan to look for a beacon from a nearby NAN cluster. If any such beacon is found, the WCD joins that cluster and synchronizes to a time synchronization function (TSF) based at least in part on receiving the beacon.

As shown by reference number 235, the second WCD may transmit an SDF during the discovery window. The SDF frame includes publish or subscribe service discovery attributes. For example, the SDF frame may indicate that a service is available at the second WCD, or may include one or more services to which the second WCD seeks to subscribe. However, the first WCD cannot receive the SDF frame without first synchronizing with the second WCD. Based at least in part on receiving the synchronization beacon during the same discovery window as the SDF frame is transmitted, the first WCD may not yet be synchronized for receiving the SDF frame. In this case, the first WCD may not be aware of services available at the second WCD during the discovery window described in connection with reference number 225.

As shown by reference number 240, the first WCD may initiate a discovery window. The discovery window of the first WCD is not synchronized in time with the discovery window of the second WCD, so the first WCD fails to receive the SDF frame transmitted during the discovery window of the second WCD.

As shown by reference number 245, the first WCD may receive, and the second WCD may transmit, a discovery beacon outside of a discovery window. The discovery beacon may provide an indication to receiving devices, such as the first WCD, for synchronizing with the second WCD for a subsequent discovery window. The second WCD may transmit the discovery beacon as a broadcast transmission (e.g., without an intended recipient and/or as a non-unicast transmission).

As shown by reference number 250, the first WCD may synchronize with the second WCD. For example, the first WCD may join or merge with a cluster of the second WCD. In this way, the first WCD may have time synchronization with the second WCD and/or other WCDs that are part of a cluster associated with the second WCD. The first WCD may synchronize with the second WCD based at least in part on the synchronization beacon described in connection with reference number 230 and/or the discovery beacon described in connection with reference number 245.

As shown by reference number 255, the second WCD may initiate a discovery window (e.g., at a periodic time or at a time associated with the synchronization beacon or the discovery beacon). As shown by reference number 260, the first WCD initiate a discovery window that is synchronized with the discovery window of the second WCD.

As shown by reference number 265, the second WCD may transmit, and the first WCD may receive, an SDF. Based at least in part on the first WCD and the second WCD being synchronized, the first WCD may receive the SDF that indicates services available at the second WCD.

As shown by reference number 270, the first WCD may discover services indicated as available at the second WCD. For example, the first WCD may inspect the SDF to identify the services within one or more information elements of the SDF. The first WCD may discover a match of an available service at the second WCD and a service seeking a connection at the first WCD. For example, the first WCD may generate a match event if service descriptor information of the SDF matches with receiver service information at the first WCD.

As shown by reference number 275, the second WCD may initiate a discovery window. As shown by reference number 280, the first WCD may initiate a discovery window that is synchronized with the discovery window of the second WCD. As shown by reference number 285, during the discovery windows of the first WCD and the second WCD, the first WCD may transmit a follow-up frame to the second WCD and/or the second WCD may transmit a follow-up frame to the first WCD. The follow-up frame may indicate a match event and/or a request to establish a data path session or a ranging session with the second WCD.

As shown by reference number 290, the first WCD and the second WCD may perform NDP setup and/or ranging setup. The NDP setup may include establishing communication parameters, such as scheduling and/or beamforming, among other examples. After establishing an NDP data path, a service associated with the second WCD may transmit one or more data frames to the first WCD over an NDP link or vice versa. Ranging setup may include exchanging signals to identify positioning information of the first WCD to the second WCD and/or from the second WCD to the first WCD.

As indicated above, FIG. 2 is provided as an example. Other examples may differ from what is described with regard to FIG. 2.

As described herein, a first WCD may experience unnecessary latency by waiting until receiving a beacon to establish synchronization, then waiting for a synchronized DW to receive an SDF to discover services available at a second WCD, and then sending a follow-up frame to initiate an NDP setup.

In some aspects described herein, beacons (e.g., NAN-based beacons) may include service-specific information.

For example, a synchronization beacon and/or a discovery beacon may include an indication of service-specific information. In some examples, the service-specific information may include an SDA, one or more information elements of an SDA (e.g., a partial SDA), a service ID, an instance ID associated with the service that is available at the second WCD, a service control type, a matching filter, a service response filter, service information associated with the service that is available at the second WCD, and/or an attribute ID associated with a service that is available at the second WCD, among other examples of service-specific information that the first WCD may use to identify whether a desired service is available at the second WCD for communication with the first WCD.

Based at least in part on including an indication of service-specific information in a beacon, a discovery process may be expedited and the first WCD may discover an available service at the second WCD with reduced latency. Based at least in part on having reduced latency, the first WCD may improve performance of one or more applications and/or may reduce power consumption associated with communicating with the second WCD multiple times to establish synchronization and to discover services.

In some aspects, the service-specific information (e.g., an SDA, a partial SDA, or indications of a service, service information, or instance ID, among other examples) contains information about a publish or subscribe service on the second WCD (e.g., a device that transmits the beacon) and is included in SDF frames. In some aspects, the service-specific information may indicate a small number (e.g., one, two, or three, for example) of publish or subscribe services per device, which may allow related information to fit inside a beacon frame with minimal added overhead or use of a minimal number of additional bytes. In some aspects, the service-specific information (e.g., an SDA) may be included as a regular NAN attribute inside a NAN information element present in the beacon or may be included in a NAN-vendor-specific information element.

In some aspects, both WCDs (e.g., NAN devices), such as a receiver and a sender, can send discovery beacons regardless of whether they are a master device or a non-master device. In some aspects, the non-master device may cease beacon transmissions once service discovery is achieved and NDP is setup.

In some aspects, the second WCD may transmit SDFs during DWs to support additional NAN devices that do not support receiving the service-specific information within a beacon.

In some aspects, only unsolicited publish or active subscribe service descriptors may be included in the beacons.

Using the beacons that indicate the service-specific information, WCDs operating as NAN devices can synchronize, as well as discover, services upon reception of a beacon (e.g., a NAN beacon frame) and generate a match event to the framework if the service descriptor information matches with the receiver service information.

Figure 3:
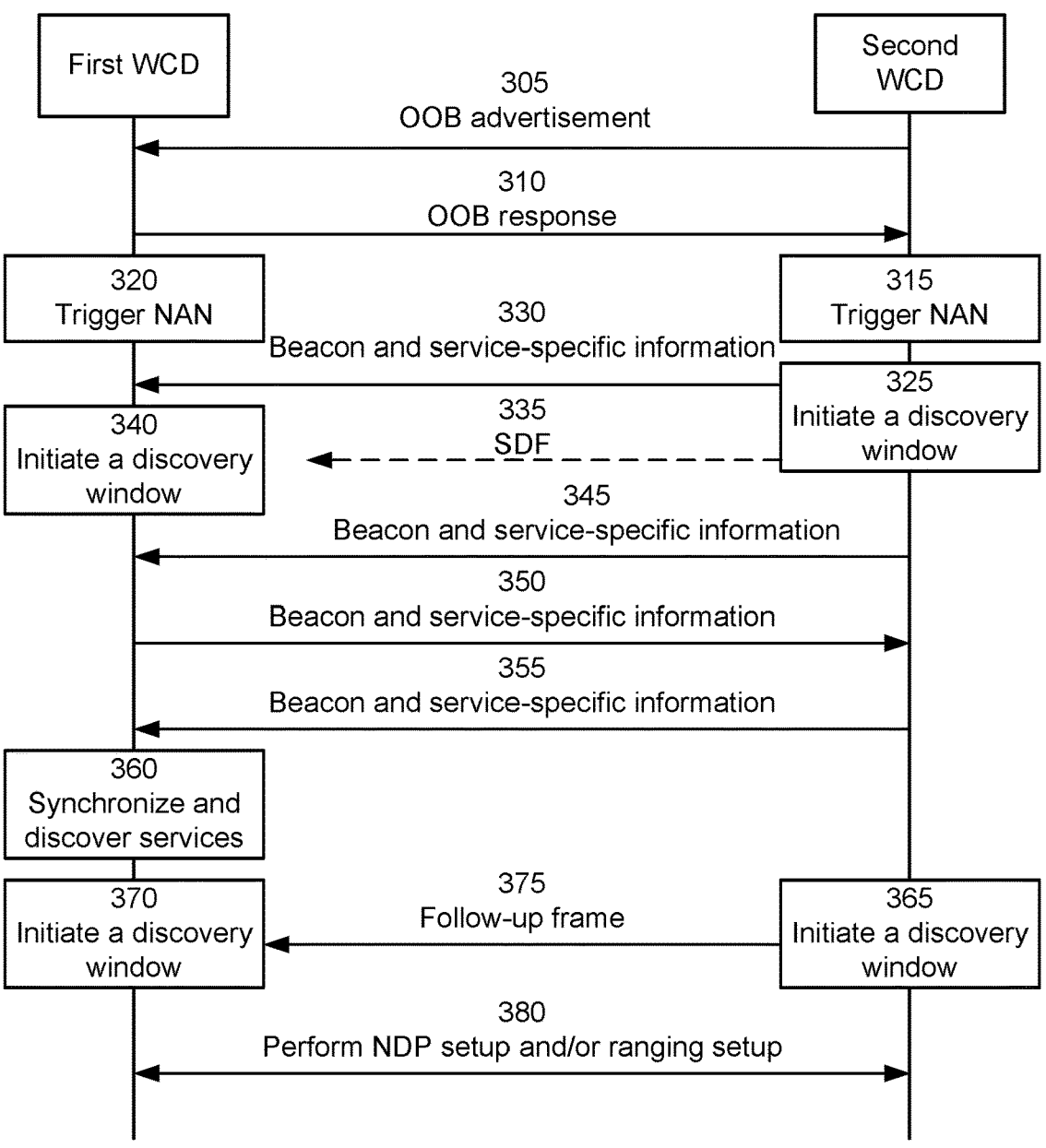
FIG. 3 is a diagram of an example associated with beacons having service-specific information, in accordance with the present disclosure.

FIG. 3 is a diagram of an example 300 associated with beacons having service-specific information, in accordance with the present disclosure. As shown in FIG. 3, a first WCD (e.g., a NAN device, a STA, or an AP, among other examples) may communicate with a second WCD (e.g., a NAN device, a STA, or an AP, among other examples). In some aspects, the first WCD and the second WCD may support NAN-based communications. In some aspects, the first WCD and the second WCD may be located within range for NAN-based communications. In some aspects, one or more of the operations described in FIG. 3 may be part of a NAN synchronization and discovery procedure. In some aspects, the first WCD may have a publish service and the second WCD may have a subscriber service in connection with performing synchronization and discovery. In some aspects, the second WCD may have a publish service and the first WCD may have a subscriber service in connection with performing synchronization and discovery.

As shown by reference number 305, the first WCD may receive, and the second WCD may transmit, an OOB advertisement. The OOB advertisement may indicate that the second WCD is available for a NAN connection. The OOB advertisement may include a message in a different protocol than the NAN connection. For example, the second WCD may transmit the message using a WPAN connection.

As shown by reference number 310, the first WCD may transmit, and the second WCD may receive, an OOB response associated with the OOB advertisement. For example, the first WCD may transmit an indication that the first WCD received the GOB advertisement and will attempt to perform a synchronization and discovery procedure.

As shown by reference number 315, the second WCD may trigger NAN operations and, as shown by reference number 320, the first WCD may trigger NAN operations. For example, the first WCD and the second WCD may trigger NAN operations based at least in part on the OOB advertisement and the OOB response indicating that the first WCD and the second WCD support and/or are available for NAN operations.

As shown by reference number 325, the second WCD may initiate a discovery window. A discovery window may be a window of time during which the second WCD may transmit an SDF to indicate one or more services available at the second WCD, to receive an indication of one or more services available at the first WCD, and/or to receive a follow-up frame that indicates a request to perform a neighbor discovery protocol (NDP) setup, among other examples.

As shown by reference number 330, the second WCD may transmit, and the first WCD may receive, a beacon (e.g., a synchronization beacon or a discovery beacon) and service-specific information (e.g., full SDA, partial SDA, and/or other service-specific information) during the discovery window. In some aspects, the first WCD may be a master device or a non-master device and the second WCD may be a master device or a non-master device during communication of the beacon and service-specific information.

In some aspects, the first WCD may receive the beacon outside of a discovery window of the second WCD and/or outside of a discovery window of the first WCD. In some aspects, the first WCD may receive the service-specific information within a standard-based NAN information element of the beacon or within a vender-specific NAN information element of the beacon.

In some aspects, the service-specific information (e.g., described in connection with reference numbers 330, 345, 350, and/or 355, among other examples) may include a full SDA message, a partial SDA message, a service ID associated with the service that is available at the second WCD, an instance ID associated with the service that is available at the second WCD, a service control type, a matching filter (e.g., parameters for identifying a service match), a service response filter, service information associated with the service that is available at the second WCD, and/or an attribute ID associated with a service that is available at the second WCD, among other examples.

The first WCD may identify whether a service (e.g., a service for which the first WCD is looking) is available at the second WCD based at least in part on the beacon and the service-specific information. In this way, the first WCD may synchronize and discover services by receiving only the beacon and without waiting to receive an SDF at a subsequent discovery window.

As shown by reference number 335, the second WCD may transmit an SDF during the discovery window. The SDF frame includes publish or subscribe service discovery attributes. For example, the SDF frame may indicate that a service is available at the second WCD, or may include one or more services to which the second WCD seeks to subscribe. However, the first WCD cannot receive the SDF frame without first synchronizing with the second WCD. Based at least in part on receiving the beacon during the same discovery window as the SDF frame is transmitted, the first WCD may not yet be synchronized for receiving the SDF frame. In this case, the first WCD may not be able to use the SDF to discover services available at the second WCD during the discovery window described in connection with reference number 325.

As shown by reference number 340, the first WCD may initiate a discovery window. The discovery window of the first WCD is not synchronized in time with the WCD of the second WCD based at least in part on the first WCD not receiving a beacon from the second WCD before the second WCD initiates the discovery window.

As shown by reference number 345, the first WCD may receive, and the second WCD may transmit, a beacon (e.g., a discovery beacon) and service-specific information. In some aspects, the first WCD may be a master device or a non-master device and the second WCD may be a master device or a non-master device during communication of the beacon and service-specific information.

In some aspects, the first WCD may receive the beacon outside of a discovery window of the second WCD and/or outside of a discovery window of the first WCD. In some aspects, the first WCD may receive the service-specific information within a standard-based NAN information element of the beacon or within a vender-specific NAN information element of the beacon.

In some aspects, the first WCD may receive the beacon with the service-specific information as an alternative to, or in addition to, receiving the beacon with the service-specific information, as described in connection with reference number 330. For example, the first WCD may not need the service-specific information from the beacon described in connection with reference number 345 after receiving the service-specific information with the beacon described in connection with reference number 330. In these cases, the service-specific information of the beacon of reference number 330 may include the same information as the service-specific information of the beacon of reference number 345.

In some aspects, the service-specific information of the beacon of reference number 330 may be different from the service-specific information of the beacon of reference number 345. For example, the service-specific information of the beacon of reference number 330 may include different information elements from the service-specific information of the beacon of reference number 345. In some aspects, the service-specific information of the beacon of reference number 330 may publish support for a different service than the service-specific information of the beacon of reference number 345.

As shown by reference number 350, the first WCD may transmit, and a second WCD may receive, a beacon and service-specific information associated with the first WCD. In some aspects, the first WCD may transmit the beacon (e.g., a discovery beacon) outside of a discovery window of the second WCD and/or outside of a discovery window of the first WCD. In some aspects, the first WCD may transmit the service-specific information within a standard-based NAN information element of the beacon or within a vender-specific NAN information element of the beacon.

In some aspects, the first WCD may be a master device or a non-master device and the second WCD may be a master device or a non-master device during communication of the beacon and service-specific information. For example, the first WCD may transmit the beacon with the service-specific information when the first WCD is a non-master device. In this way, the second WCD may discover a service match with the first WCD based at least in part on receiving the beacon and service-specific information even if the second WCD is a master device.

In some aspects, the first WCD may transmit the beacon and service-specific information in an alternative to receiving the service-specific information of the second WCD via a beacon. In this way, the first WCD may provide service matching information in the service-specific information without waiting for a beacon from the second WCD.

In some aspects, the first WCD may transmit the beacon and service-specific information after discovering services (e.g., based at least in part on the beacon and service-specific information described in connection with reference number 330) to indicate to the second WCD that a service match has occurred, and/or to request initiating a data path, a ranging session, and/or an NDP setup, among other examples.

As shown by reference number 355, the first WCD may receive, and the second WCD may transmit, a beacon and service-specific information after the second WCD receives the beacon and service-specific information from the first WCD, as described in reference number 350. For example, the second WCD may transmit the beacon and service-specific information based at least in part on identifying a service match as indicated in the beacon and service-specific information indicated by the first WCD.

In some aspects, the first WCD may receive the beacon outside of a discovery window of the second WCD and/or outside of a discovery window of the first WCD. In some aspects, the first WCD may receive the service-specific information within a standard-based NAN information element of the beacon or within a vender-specific NAN information element of the beacon.

As shown by reference number 360, the first WCD may synchronize with the second WCD and may discover services available at the second WCD based at least in part on receiving a beacon and service-specific information (e.g., within the beacon or otherwise separate from the SDF), as shown in connection with reference numbers 330, 345, and/or 355. In some aspects, the first WCD may synchronize and discover services after receiving any one of the beacons. For example, the first WCD may synchronize and discover services of the second WCD after receiving the beacon and service-specific information of reference number 330 and before subsequent beacons, after receiving the beacon and service-specific information of reference number 345 and before subsequent beacons, or after receiving the beacon and service-specific information of reference number 355.

In some aspects, the first WCD may receive the service-specific information within, or along with, a discovery beacon or a synchronization beacon. For example, the first WCD may receive the service-specific information within, or along with, a discovery beacon In some aspects, the beacon may be a discovery beacon.

In some aspects, synchronizing the first WCD with the second WCD may include joining a cluster associated with the second WCD in association with the service-specific information indicating that a service is available. In some aspects, joining the cluster may include merging with the cluster, establishing synchronization with the cluster, communicating data path setup information with the second WCD, and/or performing ranging with the second WCD, among other examples.

In some aspects, the first WCD may join the cluster and/or synchronize with the second WCD based at least in part on identifying a match event associated with service descriptor information of the service-specific information matching with receiver service information at the first WCD. In some aspects, the first WCD may generate a discovery result event based at least in part on identifying the match event.

As shown by reference number 365, the second WCD may initiate a discovery window. As shown by reference number 370, the first WCD may initiate a discovery window that is synchronized with the discovery window of the second WCD. As shown by reference number 375, during the discovery windows of the first WCD and the second WCD, the first WCD may transmit a follow-up frame to the second WCD. The follow-up frame may indicate a match event and/or a request to establish a data path session or a ranging session with the second WCD.

As shown by reference number 380, the first WCD and the second WCD may perform NDP setup and/or ranging setup. The NDP setup may include establishing communication parameters, such as scheduling, exchanging committed schedules, exchanging rates (e.g., data rates), and/or beam-forming, among other examples.

In some aspects, the first WCD may communicate with the second WCD based at least in part on joining the cluster of the second WCD and/or performing the NDP setup. For example, the first WCD and the second WCD may communicate follow-up frames, establish a data path session, and/or establish a ranging session, among other examples. In this way, the first WCD and/or the second WCD may discover services without waiting for reception of an SDF. By including an indication of service-specific information in a beacon, a discovery process may be expedited and the first WCD may discover an available service at the second WCD with reduced latency. Based at least in part on having reduced latency, the first WCD may improve performance of one or more applications and/or may reduce power consumption associated with communicating with the second WCD multiple times to establish synchronization and to discover services.

As indicated above, FIG. 3 is provided as an example. Other examples may differ from what is described with regard to FIG. 3.

As described, after synchronization and discovery, the first WCD and the second WCD may perform ranging. Aspects of transmissions may vary according to a distance between a transmitter (for example, an AP 102 or a STA 104) and a receiver (for example, another AP 102 or STA 104). Wireless communication devices may generally benefit from having information regarding the location or proximities of the various STAs 104 within the coverage area. In some examples, relevant distances may be determined (for example, calculated or computed) using return trip time (RTT)-based ranging procedures. Additionally, in some examples, APs 102 and STAs 104 may perform ranging operations. Each ranging operation may involve an exchange of fine timing measurement (FTM) frames (such as those defined in the 802.11az amendment to the IEEE family of wireless communication protocol standards) to obtain measurements of RTT transmissions between the wireless communication devices.

Figure 4:
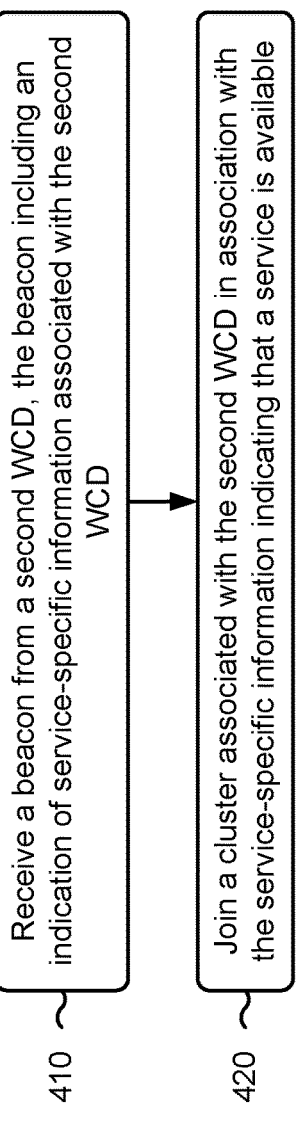
FIG. 4 is a diagram illustrating an example process performed, for example, by a first wireless communication device (WCD), in accordance with the present disclosure.

FIG. 4 is a diagram illustrating an example process 400 performed, for example, by a first WCD, in accordance with the present disclosure. Example process 400 is an example where the first WCD (e.g., STA 104 or AP 102) performs operations associated with beacons having service-specific information.

As shown in FIG. 4, in some aspects, process 400 may include receiving a beacon from a second WCD, the beacon including an indication of service-specific information associated with the second WCD (block 410). For example, the first WCD (e.g., using reception component 602 and/or communication manager 606, depicted in FIG. 6) may receive a beacon from a second WCD, the beacon including an indication of service-specific information associated with the second WCD, as described above.

As further shown in FIG. 4, in some aspects, process 400 may include joining a cluster associated with the second WCD in association with the service-specific information indicating that a service is available (block 420). For example, the WCD (e.g., using communication manager 606, depicted in FIG. 6) may join a cluster associated with the second WCD in association with the service-specific information indicating that a service is available, as described above.

Process 400 may include additional aspects, such as any single aspect or any combination of aspects described below and/or in connection with one or more other processes described elsewhere herein.

In a first aspect, joining the cluster comprises one or more of merging with the cluster establishing synchronization with the cluster, communicating data path setup information with the second WCD, or performing ranging with the second WCD.

In a second aspect, alone or in combination with the first aspect, process 400 includes communicating with the second WCD based at least in part on joining the cluster.

In a third aspect, alone or in combination with one or more of the first and second aspects, process 400 includes transmitting an additional beacon, the additional beacon including an additional indication of additional service-specific information associated with the first WCD.

In a fourth aspect, alone or in combination with one or more of the first through third aspects, the first WCD is a non-master device during transmission of the additional beacon, or the first WCD is a master device during transmission of the additional beacon.

In a fifth aspect, alone or in combination with one or more of the first through fourth aspects, the first WCD is a non-master device during reception of the beacon from the second WCD, wherein the first WCD is a master device during reception of the beacon from the second WCD, wherein the second WCD is a non-master device during reception of the beacon from the second WCD, or wherein the second WCD is a master device during reception of the beacon from the second WCD.

In a sixth aspect, alone or in combination with one or more of the first through fifth aspects, the service-specific information comprises one or more of a full SDA message, a partial SDA message, a service ID associated with the service that is available at the second WCD, an instance ID associated with the service that is available at the second WCD, a service control type, a matching filter, a service response filter, servicing information associated with the service that is available at the second WCD, or an attribute ID associated with a service that is available at the second WCD.

In a seventh aspect, alone or in combination with one or more of the first through sixth aspects, receiving the beacon comprises one or more of receiving the beacon outside of a discovery window of the second WCD, or receiving the beacon as part of a NAN synchronization and discovery procedure.

In an eighth aspect, alone or in combination with one or more of the first through seventh aspects, the beacon comprises a synchronization beacon or a discovery beacon.

In a ninth aspect, alone or in combination with one or more of the first through eighth aspects, receiving the beacon including the indication of the service-specific information associated with the second WCD comprises receiving the service-specific information within a standard-based NAN information element of the beacon, or receiving the service-specific information within a vender-specific NAN information element of the beacon.

In a tenth aspect, alone or in combination with one or more of the first through ninth aspects, joining the cluster associated with the second WCD in association with the service-specific information indicating that a service is available comprises one or more of identifying a match event based at least in part on service descriptor information of the service-specific information matching with receiver service information at the first WCD, or generating a discovery result event.

In an eleventh aspect, alone or in combination with one or more of the first through tenth aspects, the first WCD has a publish service and the second WCD has a subscribe service, or the first WCD has a subscribe service and the second WCD has a publish service.

In a twelfth aspect, alone or in combination with one or more of the first through eleventh aspects, process 400 includes discovering services of the second WCD without waiting for reception of an SDF from the second WCD, and communicating with the second WCD based at least in part on joining the cluster, the communicating comprising one or more of communicating follow-up frames with the second WCD, establishing a data path session with the second WCD, or establishing a ranging session with the second WCD.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
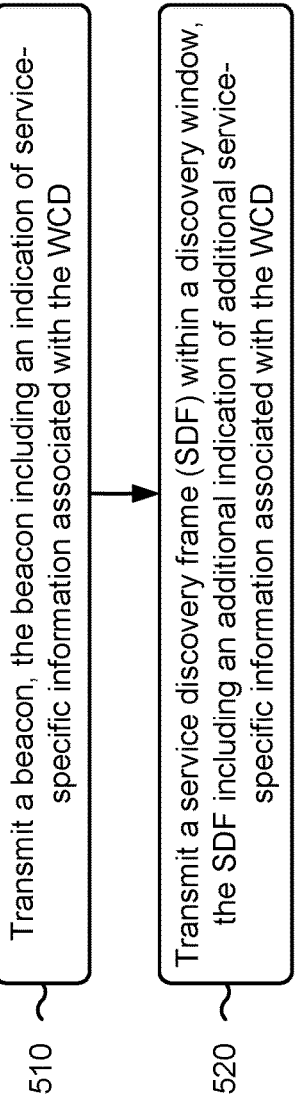
FIG. 5 is a diagram illustrating an example process performed, for example, by a WCD, in accordance with the present disclosure.

FIG. 5 is a diagram illustrating an example process 500 performed, for example, by a WCD, in accordance with the present disclosure. Example process 500 is an example where the WCD (e.g., WCD STA 104 or AP 102) performs operations associated with beacons having service-specific information.

As shown in FIG. 5, in some aspects, process 500 may include transmitting a beacon, the beacon including an indication of service-specific information associated with the WCD (block 510). For example, the WCD (e.g., using transmission component 704 and/or communication manager 706, depicted in FIG. 7) may transmit a beacon, the beacon including an indication of service-specific information associated with the WCD, as described above.

As further shown in FIG. 5, in some aspects, process 500 may include transmitting an SDF within a discovery window, the SDF including an additional indication of additional service-specific information associated with the WCD (block 520). For example, the WCD (e.g., using transmission component 804 and/or communication manager 706, depicted in FIG. 7) may transmit an SDF within a discovery window, the SDF including an additional indication of additional service-specific information associated with the WCD, as described above.

Process 500 may include additional aspects, such as any single aspect or any combination of aspects described below and/or in connection with one or more other processes described elsewhere herein.

In a first aspect, process 500 includes establishing synchronization with an additional WCD, communicating data path setup information with the additional WCD, or performing ranging with the additional WCD.

In a second aspect, alone or in combination with the first aspect, process 500 includes communicating with an additional WCD based at least in part on the additional WCD joining a cluster associated with the WCD.

In a third aspect, alone or in combination with one or more of the first and second aspects, process 500 includes receiving an additional beacon from an additional WCD, the additional beacon including an additional indication of additional service-specific information associated with the additional WCD.

In a fourth aspect, alone or in combination with one or more of the first through third aspects, the additional WCD is a non-master device during reception of the additional beacon, or the additional WCD is a master device during reception of the additional beacon.

In a fifth aspect, alone or in combination with one or more of the first through fourth aspects, the WCD is a non-master device during transmission of the beacon, wherein the WCD is a master device during transmission of the beacon, wherein an additional WCD is a non-master device during transmission of the beacon, or wherein the additional WCD is a master device during transmission of the beacon.

In a sixth aspect, alone or in combination with one or more of the first through fifth aspects, the service-specific information comprises one or more of a full SDA message, a partial SDA message, a service ID associated with the service that is available at an additional WCD, an instance ID associated with the service that is available at the additional WCD, a service control type, a matching filter, a service response filter, servicing information associated with the service that is available at the additional WCD, or an attribute ID associated with a service that is available at the additional WCD.

In a seventh aspect, alone or in combination with one or more of the first through sixth aspects, transmitting the beacon comprises one or more of transmitting the beacon outside of a discovery window of the WCD, or transmitting the beacon as part of a NAN synchronization and discovery procedure.

In an eighth aspect, alone or in combination with one or more of the first through seventh aspects, the beacon comprises a synchronization beacon or a discovery beacon.

In a ninth aspect, alone or in combination with one or more of the first through eighth aspects, transmitting the beacon including the indication of the service-specific information associated with the WCD comprises transmitting the service-specific information within a standard-based NAN information element of the beacon, or transmitting the service-specific information within a vender-specific NAN information element of the beacon.

In a tenth aspect, alone or in combination with one or more of the first through ninth aspects, the WCD has a publish service and an additional WCD has a subscribe service, or the WCD has a subscribe service and the additional WCD has a publish service.

In an eleventh aspect, alone or in combination with one or more of the first through tenth aspects, process 500 includes communicating with an additional WCD based at least in part on the additional WCD joining a cluster of the WCD, the communicating comprising one or more of communicating follow-up frames with the additional WCD, establishing a data path session with the additional WCD, or establishing a ranging session with the additional WCD.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
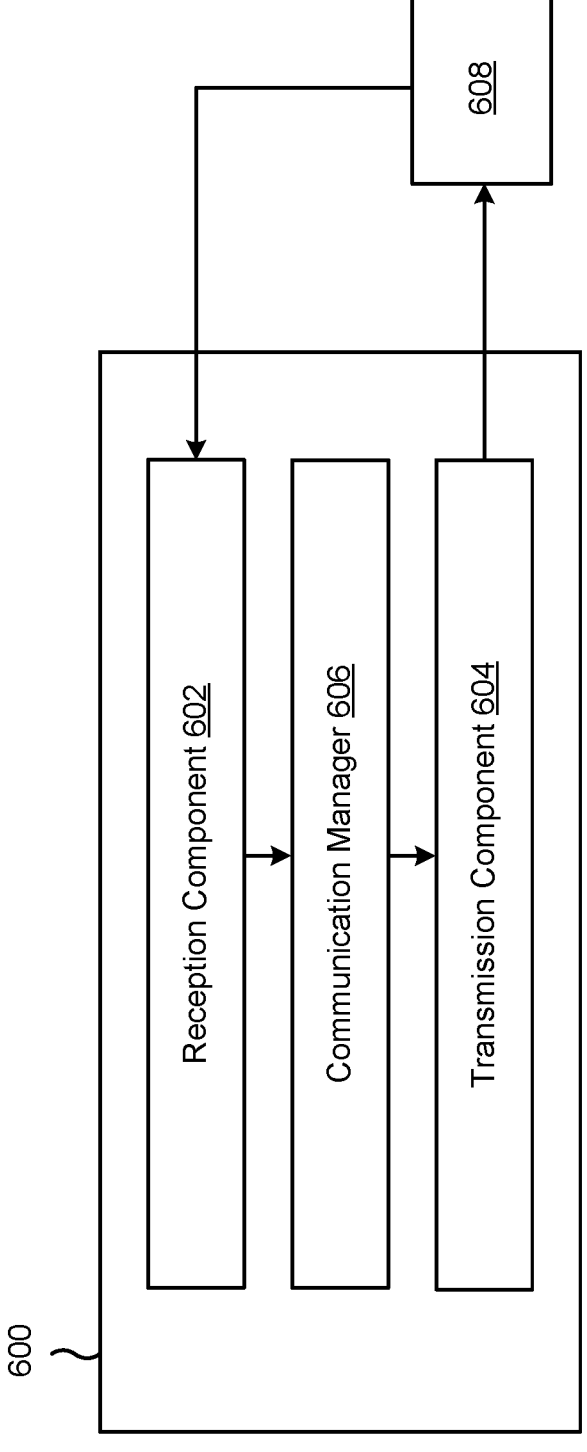
FIG. 6 is a diagram of an example apparatus for wireless communication, in accordance with the present disclosure.

FIG. 6 is a diagram of an example apparatus 600 for wireless communication, in accordance with the present disclosure. The apparatus 600 may be a first WCD, or a first WCD may include the apparatus 600. In some aspects, the apparatus 600 includes a reception component 602, a transmission component 604, and/or a communication manager 606, which may be in communication with one another (for example, via one or more buses and/or one or more other components). As shown, the apparatus 600 may communicate with another apparatus 606, such as a STA or an AP using the reception component 602 and the transmission component 604.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as beacons, reference signals, control information, or data communications, or a combination thereof, from the apparatus 608. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the first WCD.

The transmission component 604 may transmit communications, such as reference signals, control information, data communications, or a combination thereof, to the apparatus 608. In some aspects, one or more other components of the apparatus 600 may generate communications and may provide the generated communications to the transmission component 604 for transmission to the apparatus 608. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 604 may include one or more antennas, a modem, a modulator, a transmit MIMO processor, a transmit processor, a controller/processor, a memory, or a combination thereof, of the first WCD described in connection with FIG. 2. In some aspects, the transmission component 604 may be co-located with the reception component 602 in a transceiver.

The communication manager 606 may support operations of the reception component 602 and/or the transmission component 604. For example, the communication manager 606 may receive information associated with configuring reception of communications by the reception component 602 and/or transmission of communications by the transmission component 604. Additionally, or alternatively, the communication manager 606 may generate and/or provide control information to the reception component 602 and/or the transmission component 604 to control reception and/or transmission of communications.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
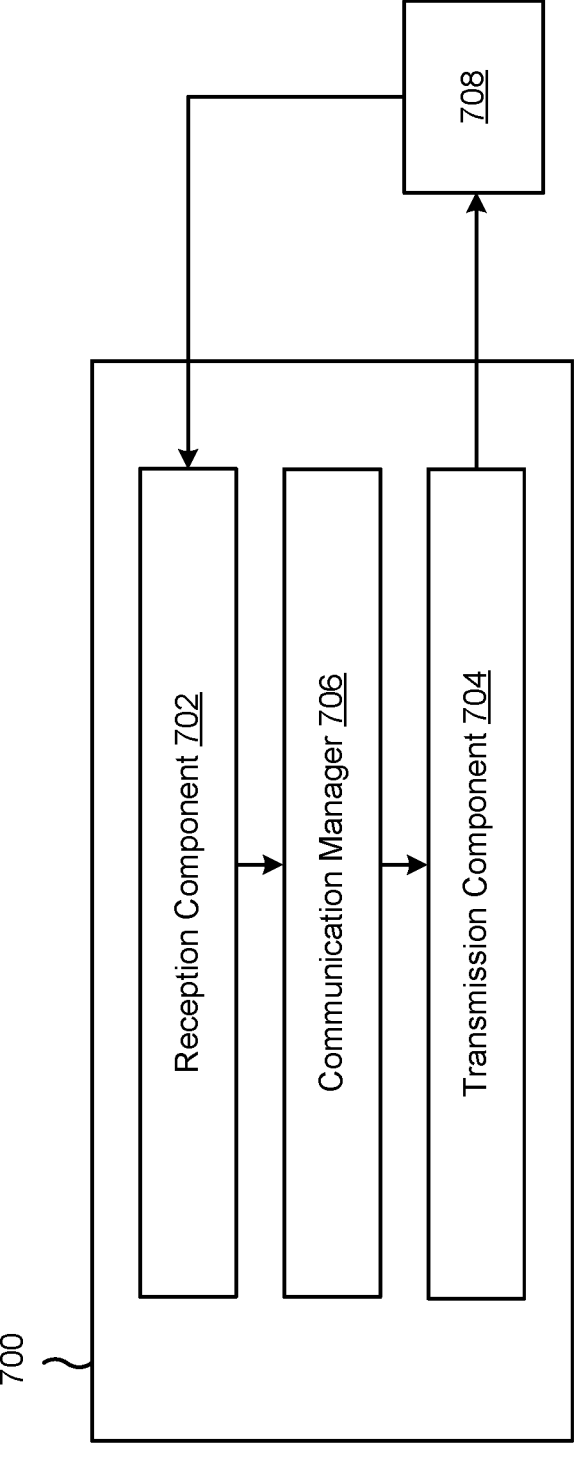
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a WCD, or a WCD may include the apparatus 700. In some aspects, the apparatus 700 includes a reception component 702, a transmission component 704, and/or a communication manager 706, which may be in communication with one another (for example, via one or more buses and/or one or more other components). As shown, the apparatus 700 may communicate with another apparatus 708, such as a STA or an AP, using the reception component 702 and the transmission component 704.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as beacons, reference signals, control information, data communications, or a combination thereof, from the apparatus 708. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the WCD.

The transmission component 704 may transmit communications, such as reference signals, control information, data communications, or a combination thereof, to the apparatus 708. In some aspects, one or more other components of the apparatus 700 may generate communications and may provide the generated communications to the transmission component 704 for transmission to the apparatus 708. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 704 may include one or more antennas, a modem, a modulator, a transmit MIMO processor, a transmit processor, a controller/processor, a memory, or a combination thereof, of the WCD described in connection with FIG. 2. In some aspects, the transmission component 704 may be co-located with the reception component 702 in a transceiver.

The communication manager 706 may support operations of the reception component 702 and/or the transmission component 704. For example, the communication manager 706 may receive information associated with configuring reception of communications by the reception component 702 and/or transmission of communications by the transmission component 704. Additionally, or alternatively, the communication manager 706 may generate and/or provide control information to the reception component 702 and/or the transmission component 704 to control reception and/or transmission of communications.

The transmission component 704 may transmit a beacon, the beacon including an indication of service-specific information associated with the WCD. The transmission component 704 may transmit an SDF within a discovery window, the SDF including an additional indication of additional service-specific information associated with the WCD.

The communication manager 706 may establish synchronization with an additional WCD.

The communication manager 706 may communicate data path setup information with the additional WCD.

The communication manager 706 may perform ranging with the additional WCD.

The communication manager 706 may communicate with an additional WCD based at least in part on the additional WCD joining a cluster associated with the WCD.

The reception component 702 may receive an additional beacon from an additional WCD, the additional beacon including an additional indication of additional service-specific information associated with the additional WCD.

The communication manager 706 may communicate with an additional WCD based at least in part on the additional WCD joining a cluster of the WCD, the communicating comprising one or more of communicating follow-up frames with the additional WCD, establishing a data path session with the additional WCD, or establishing a ranging session with the additional WCD.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a first wireless communication device (WCD), comprising: receiving a beacon from a second WCD, the beacon including an indication of service-specific information associated with the second WCD; and joining a cluster associated with the second WCD in association with the service-specific information indicating that a service is available.

Aspect 2: The method of Aspect 1, wherein joining the cluster comprises one or more of: merging with the cluster establishing synchronization with the cluster, communicating data path setup information with the second WCD, or performing ranging with the second WCD.

Aspect 3: The method of any of Aspects 1-2, further comprising: communicating with the second WCD based at least in part on joining the cluster.

Aspect 4: The method of any of Aspects 1-3, further comprising: transmitting an additional beacon, the additional beacon including an additional indication of additional service-specific information associated with the first WCD.

Aspect 5: The method of Aspect 4, wherein the first WCD is a non-master device during transmission of the additional beacon, or wherein the first WCD is a master device during transmission of the additional beacon.

Aspect 6: The method of any of Aspects 1-5, wherein the first WCD is a non-master device during reception of the beacon from the second WCD, wherein the first WCD is a master device during reception of the beacon from the second WCD, wherein the second WCD is a non-master device during reception of the beacon from the second WCD, or wherein the second WCD is a master device during reception of the beacon from the second WCD.

Aspect 7: The method of any of Aspects 1-6, wherein the service-specific information comprises one or more of: a full service descriptor attribute (SDA) message, a partial SDA message, a service identifier (ID) associated with the service that is available at the second WCD, an instance ID associated with the service that is available at the second WCD, a service control type, a matching filter, a service response filter, service information associated with the service that is available at the second WCD, or an attribute ID associated with a service that is available at the second WCD.

Aspect 8: The method of any of Aspects 1-7, wherein receiving the beacon comprises one or more of: receiving the beacon outside of a discovery window of the second WCD, or receiving the beacon as part of a neighborhood area network (NAN) synchronization and discovery procedure.

Aspect 9: The method of any of Aspects 1-8, wherein the beacon comprises a synchronization beacon or a discovery beacon.

Aspect 10: The method of any of Aspects 1-9, wherein receiving the beacon including the indication of the service-specific information associated with the second WCD comprises: receiving the service-specific information within a standard-based neighborhood area network (NAN) information element of the beacon, or receiving the service-specific information within a vender-specific NAN information element of the beacon.

Aspect 11: The method of any of Aspects 1-10, wherein joining the cluster associated with the second WCD in association with the service-specific information indicating that a service is available comprises one or more of: identifying a match event based at least in part on service descriptor information of the service-specific information matching with receiver service information at the first WCD, or generating a discovery result event.

Aspect 12: The method of any of Aspects 1-11, wherein the first WCD has a publish service and the second WCD has a subscribe service, or wherein the first WCD has a subscribe service and the second WCD has a publish service.

Aspect 13: The method of any of Aspects 1-12, further comprising discovering services of the second WCD without waiting for reception of a Service Discovery Frame (SDF) from the second WCD; and communicating with the second WCD based at least in part on joining the cluster, communicating comprising one or more of: communicating follow-up frames with the second WCD, establishing a data path session with the second WCD, or establishing a ranging session with the second WCD.

Aspect 14: A method of wireless communication performed by a wireless communication device (WCD), comprising: transmitting a beacon, the beacon including an indication of service-specific information associated with the WCD; and transmitting a service discovery frame (SDF) within a discovery window, the SDF including an additional indication of additional service-specific information associated with the WCD.

Aspect 15: The method of Aspect 14, further comprising: establishing synchronization with an additional WCD, communicating data path setup information with the additional WCD, or performing ranging with the additional WCD.

Aspect 16: The method of any of Aspects 14-15, further comprising: communicating with an additional WCD based at least in part on the additional WCD joining a cluster associated with the WCD.

Aspect 17: The method of any of Aspects 14-16, further comprising: receiving an additional beacon from an additional WCD, the additional beacon including an additional indication of additional service-specific information associated with the additional WCD.

Aspect 18: The method of Aspect 17, wherein the additional WCD is a non-master device during reception of the additional beacon, or wherein the additional WCD is a master device during reception of the additional beacon.

Aspect 19: The method of any of Aspects 14-18, wherein the WCD is a non-master device during transmission of the beacon, wherein the WCD is a master device during transmission of the beacon, wherein an additional WCD is a non-master device during transmission of the beacon, or wherein the additional WCD is a master device during transmission of the beacon.

Aspect 20: The method of any of Aspects 14-19, wherein the service-specific information comprises one or more of: a full service descriptor attribute (SDA) message, a partial SDA message, a service identifier (ID) associated with the service that is available at an additional WCD, an instance ID associated with the service that is available at the additional WCD, a service control type, a matching filter, a service response filter, service information associated with the service that is available at the additional WCD, or an attribute ID associated with a service that is available at the additional WCD.

Aspect 21: The method of any of Aspects 14-20, wherein transmitting the beacon comprises one or more of: transmitting the beacon outside of a discovery window of the WCD, or transmitting the beacon as part of a neighborhood area network (NAN) synchronization and discovery procedure.

Aspect 22: The method of any of Aspects 14-21, wherein the beacon comprises a synchronization beacon or a discovery beacon.

Aspect 23: The method of any of Aspects 14-22, wherein transmitting the beacon including the indication of the service-specific information associated with the WCD comprises: transmitting the service-specific information within a standard-based neighborhood area network (NAN) information element of the beacon, or transmitting the service-specific information within a vender-specific NAN information element of the beacon.

Aspect 24: The method of any of Aspects 14-23, wherein the WCD has a publish service and an additional WCD has a subscribe service, or wherein the WCD has a subscribe service and the additional WCD has a publish service.

Aspect 25: The method of any of Aspects 14-24, further comprising communicating with an additional WCD based at least in part on the additional WCD joining a cluster of the WCD, communicating comprising one or more of: communicating follow-up frames with the additional WCD, establishing a data path session with the additional WCD, or establishing a ranging session with the additional WCD.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device (WCD) for wireless communication, comprising:
  one or more memories; and
  one or more processors, coupled to the one or more memories, configured to:
    receive, from a second WCD, an out-of-band (OOB) advertisement indicating that the second WCD is available for a neighborhood area network (NAN) connection, the OOB advertisement including a message in a different protocol than the NAN connection;
    transmit an OOB response indicating that the OOB advertisement was received by the first WCD;
    receive a beacon from the second WCD and based at least in part on the OOB response, the beacon including an indication of service-specific information associated with the second WCD; and
    join a cluster associated with the second WCD in association with the service-specific information indicating that a service is available.

2. The first WCD of claim 1, wherein the one or more processors, to join the cluster, are configured to:
  merge with the cluster
  establish synchronization with the cluster,
  communicate data path setup information with the second WCD, or
  perform ranging with the second WCD.

3. The first WCD of claim 1, wherein the one or more processors are further configured to:
  communicate with the second WCD based at least in part on joining the cluster.

4. The first WCD of claim 1, wherein the one or more processors are further configured to:
  transmit an additional beacon, the additional beacon including an additional indication of additional service-specific information associated with the first WCD.

5. The first WCD of claim 4, wherein the first WCD is a non-master device during transmission of the additional beacon, or
  wherein the first WCD is a master device during transmission of the additional beacon.

6. The first WCD of claim 1, wherein the first WCD is a non-master device during reception of the beacon from the second WCD,
  wherein the first WCD is a master device during reception of the beacon from the second WCD,
    wherein the second WCD is a non-master device during reception of the beacon from the second WCD, or

26 wherein the second WCD is a master device during reception of the beacon from the second WCD.

7. The first WCD of claim 1, wherein the service-specific information comprises one or more of:
  a full service descriptor attribute (SDA) message,
  a partial SDA message,
  a service identifier (ID) associated with the service that is available at the second WCD,
  an instance ID associated with the service that is available at the second WCD,
  a service control type,
  a matching filter,
  a service response filter,
  service information associated with the service that is available at the second WCD, or
  an attribute ID associated with a service that is available at the second WCD.

8. The first WCD of claim 1, wherein the one or more processors, to receive the beacon, are configured to:
  receive the beacon outside of a discovery window of the second WCD, or
  receive the beacon as part of a synchronization and discovery procedure.

9. The first WCD of claim 1, wherein the beacon comprises a synchronization beacon or a discovery beacon.

10. The first WCD of claim 1, wherein the one or more processors, to receive the beacon, are configured to:
  receive the service-specific information within a standard-based information element of the beacon, or
  receive the service-specific information within a vender-specific NAN information element of the beacon.

11. The first WCD of claim 1, wherein the one or more processors, to join the cluster associated with the second WCD in association with the service-specific information indicating that a service is available, are configured to:
  identify a match event based at least in part on service descriptor information of the service-specific information matching with receiver service information at the first WCD, or
  generate a discovery result event.

12. The first WCD of claim 1, wherein the first WCD has a publish service and the second WCD has a subscribe service, or
  wherein the first WCD has a subscribe service and the second WCD has a publish service.

13. The first WCD of claim 1, wherein the one or more processors are further configured to:
  discover services of the second WCD without waiting for reception of a Service Discovery Frame (SDF) from the second WCD; and
  communicate with the second WCD based at least in part on joining the cluster, the communicating comprising one or more of:
    communication of follow-up frames with the second WCD,
    establishment of a data path session with the second WCD, or
    establishment of a ranging session with the second WCD.

14. A wireless communication device (WCD) for wireless communication, comprising:
  one or more memories; and
  one or more processors, coupled to the one or more memories, configured to:
    transmit an out-of-band (OOB) advertisement indicating that the WCD is available for a neighborhood area network (NAN) connection, the OOB advertisement including a message in a different protocol than the NAN connection;

receive an OOB response indicating that the OOB advertisement was received by another WCD;

transmit, based at least in part on the OOB response, a beacon, the beacon including an indication of service-specific information associated with the WCD; and transmit a service discovery frame (SDF) within a discovery window, the SDF including an additional indication of additional service-specific information associated with the WCD.

15. The WCD of claim 14, wherein the one or more processors are further configured to:

establish synchronization with an additional WCD, communicate data path setup information with the additional WCD, or perform ranging with the additional WCD.

16. The WCD of claim 14, wherein the one or more processors are further configured to:

communicate with an additional WCD based at least in part on the additional WCD joining a cluster associated with the WCD.

17. The WCD of claim 14, wherein the one or more processors are further configured to:

receive an additional beacon from an additional WCD, the additional beacon including an additional indication of additional service-specific information associated with the additional WCD.

18. The WCD of claim 17, wherein the additional WCD is a non-master device during reception of the additional beacon, or wherein the additional WCD is a master device during reception of the additional beacon.

19. The WCD of claim 14, wherein the WCD is a non-master device during transmission of the beacon, wherein the WCD is a master device during transmission of the beacon, wherein an additional WCD is a non-master device during transmission of the beacon, or wherein the additional WCD is a master device during transmission of the beacon.

20. The WCD of claim 14, wherein the service-specific information comprises one or more of:

a full service descriptor attribute (SDA) message, a partial SDA message, a service identifier (ID) associated with a service that is available at an additional WCD, an instance ID associated with the service that is available at the additional WCD, a service control type, a matching filter, a service response filter, service information associated with the service that is available at the additional WCD, or an attribute ID associated with a service that is available at the additional WCD.

21. The WCD of claim 14, wherein the one or more processors, to transmit the beacon, are configured to:

transmit the beacon outside of a discovery window of the WCD, or transmit the beacon as part of a synchronization and discovery procedure.

22. The WCD of claim 14, wherein the beacon comprises a synchronization beacon or a discovery beacon.

23. The WCD of claim 14, wherein the one or more processors, to transmit the beacon including the indication of the service-specific information associated with the WCD, are configured to:

transmit the service-specific information within a standard-based information element of the beacon, or transmit the service-specific information within a vender-specific NAN information element of the beacon.

24. The WCD of claim 14, wherein the WCD has a publish service and an additional WCD has a subscribe service, or wherein the WCD has a subscribe service and the additional WCD has a publish service.

25. The WCD of claim 14, wherein the one or more processors are further configured communicate with an additional WCD based at least in part on the additional WCD joining a cluster of the WCD, the communicating comprising one or more of:

communication of follow-up frames with the additional WCD, establishment of a data path session with the additional WCD, or establishment of a ranging session with the additional WCD.

26. A method of wireless communication performed by a first wireless communication device (WCD), comprising:

receiving, from a second WCD, an out-of-band (OOB) advertisement indicating that the second WCD is available for a neighborhood area network (NAN) connection, the OOB advertisement including a message in a different protocol than the NAN connection;

transmitting an OOB response indicating that the OOB advertisement was received by the first WCD receiving a beacon from the second WCD and based at least in part on the OOB response, the beacon including an indication of service-specific information associated with the second WCD; and joining a cluster associated with the second WCD in association with the service-specific information indicating that a service is available.

27. The method of claim 26, wherein the first WCD is a non-master device during reception of the beacon from the second WCD, wherein the first WCD is a master device during reception of the beacon from the second WCD, wherein the second WCD is a non-master device during reception of the beacon from the second WCD, or wherein the second WCD is a master device during reception of the beacon from the second WCD.

28. The method of claim 26, wherein the service-specific information comprises one or more of:

a full service descriptor attribute (SDA) message, a partial SDA message, a service identifier (ID) associated with the service that is available at the second WCD, an instance ID associated with the service that is available at the second WCD, a service control type, a matching filter, a service response filter, service information associated with the service that is available at the second WCD, or an attribute ID associated with a service that is available at the second WCD.

29. A method of wireless communication performed by a wireless communication device (WCD), comprising:

transmitting an out-of-band (OOB) advertisement indi-
cating that the WCD is available for a neighborhood
area network (NAN) connection, the OOB advertise-
ment including a message in a different protocol than
the NAN connection;

receiving an OOB response indicating that the OOB
advertisement was received by another WCD;

transmitting, based at least in part on the OOB response,
a beacon, the beacon including an indication of service-
specific information associated with the WCD; and transmitting a service discovery frame (SDF) within a
discovery window, the SDF including an additional
indication of additional service-specific information
associated with the WCD.

30. The method of claim 29, further comprising:

establishing synchronization with an additional WCD, communicating data path setup information with the
additional WCD, or performing ranging with the additional WCD.

* * * * *